United States Patent [19]

Iggulden et al.

[11] Patent Number: 4,852,802
[45] Date of Patent: Aug. 1, 1989

[54] SMART IRRIGATION SPRINKLERS

[75] Inventors: Jerry R. Iggulden, 21600 Cleardale St., Newhall, Calif. 91321; Donald A. Streck, 832 Country Dr., Ojai, Calif. 93023; Joseph W. Pender, 21550 Cleardale St., Newhall, Calif. 91321

[73] Assignees: Jerry Iggulden; Joseph Pender, both of Santa Clarita; Donald A. Streck, Ojai, all of Calif.

[21] Appl. No.: 229,555

[22] Filed: Aug. 8, 1988

[51] Int. Cl.4 ..................... B05B 12/08; A01G 25/16
[52] U.S. Cl. ......................................... 239/64; 239/69; 239/70; 239/310; 137/78.3
[58] Field of Search .................. 239/63, 64, 69, 70, 239/310; 137/78.2, 78.3

[56]  References Cited

U.S. PATENT DOCUMENTS

| | | | |
|---|---|---|---|
| 4,396,149 | 8/1983 | Hirsch | 239/63 |
| 4,541,563 | 9/1985 | Uetsuhara | 239/64 |
| 4,545,396 | 10/1985 | Miller et al. | 239/64 |

FOREIGN PATENT DOCUMENTS

| | | | |
|---|---|---|---|
| 3238073 | 12/1983 | Fed. Rep. of Germany | 239/64 |
| 2132767 | 7/1984 | United Kingdom | 239/63 |
| 8704275 | 7/1987 | World Int. Prop. O. | 239/63 |

Primary Examiner—Andres Kashnikow
Assistant Examiner—Karen B. Merritt
Attorney, Agent, or Firm—Donald A. Streck

[57] ABSTRACT

An improved automated irrigation system having localized moisture needs input to the control function. There is a sprinkler head connected to a supply of water under pressure by a pipe having a valve therein. A moisture sensing probe is placed in the soil adjacent the sprinkler head for developing an electrical signal representing the moisture content of the soil surrounding the probe. There is irrigation bypass logic disposed at the probe and operably connected to the valve and the probe for comparing the moisture content of the soil surrounding the probe to pre-established limits and for preventing the valve from supplying water to the sprinkler head when there is sufficient moisture in the soil. A timer controller can be employed to provide operating power to the system only at preferred times for watering. The moisture parameters for watering are adjustable. There is a wirelessly connected version eliminating wires between the probes and the valves. Supplemental valves are employed in branch lines and riser pipes to give more accurate control over localized areas and planting. Preferred power is supplied by a rechargeable battery recharged by a solar panel. There is apparatus for optimally adding fertilizer to the irrigation water as part of the moisture controlled system or on a stand-alone basis.

16 Claims, 4 Drawing Sheets

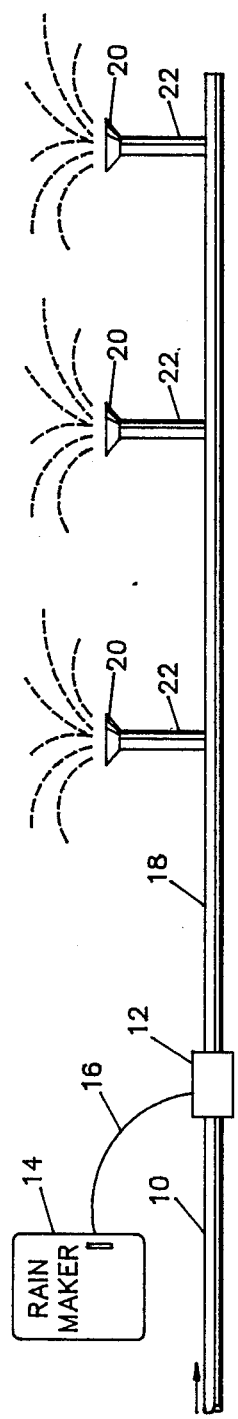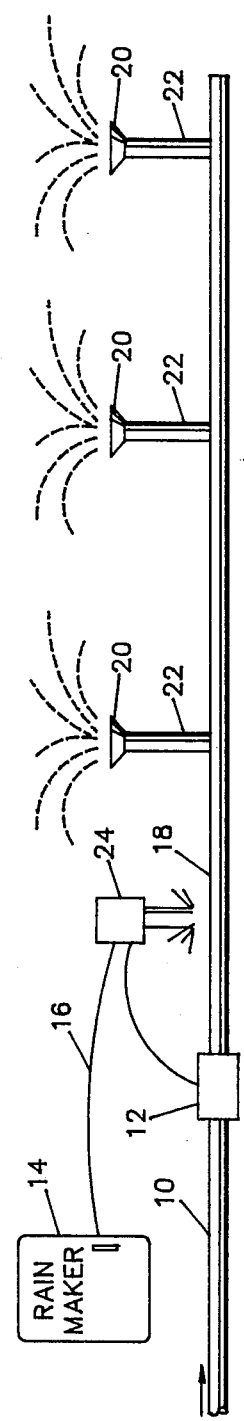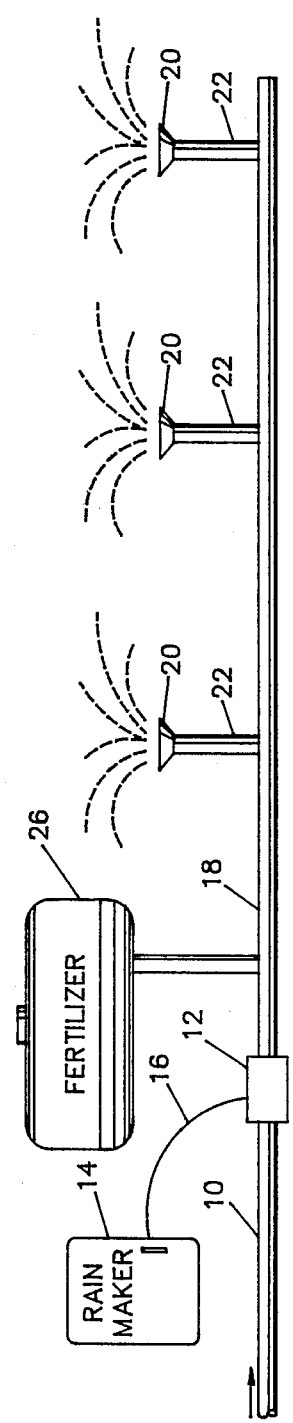

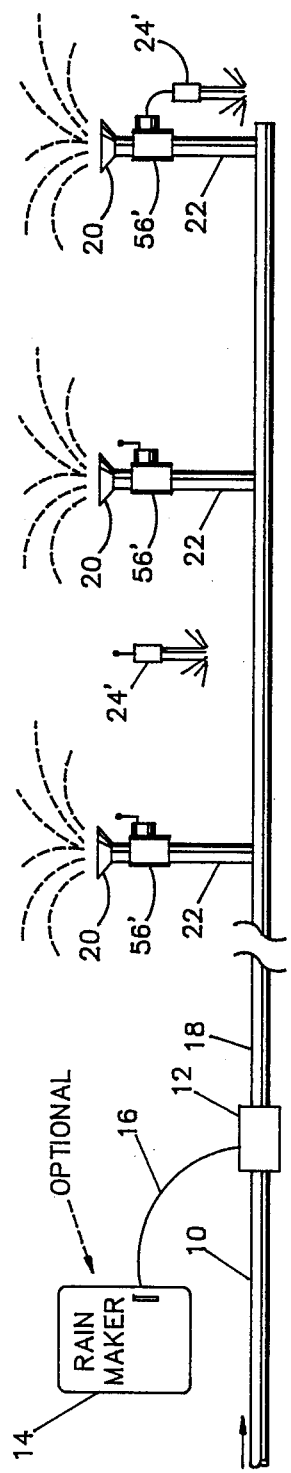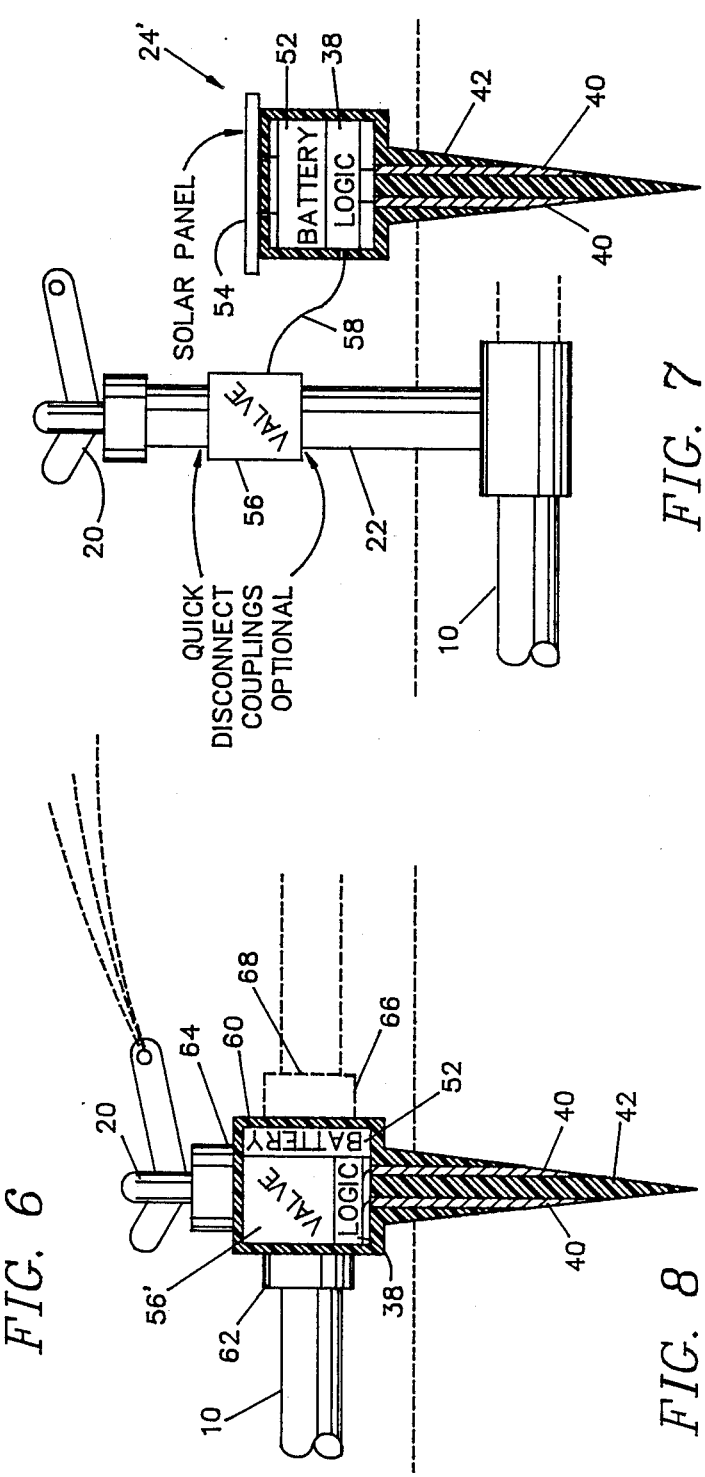

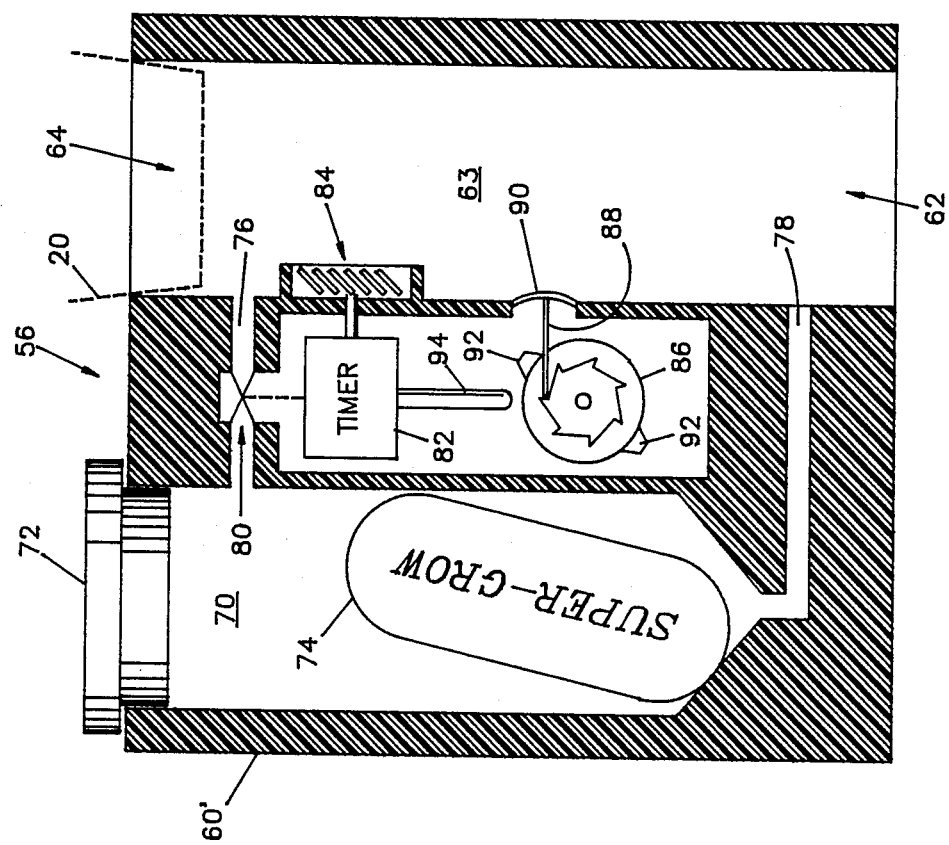
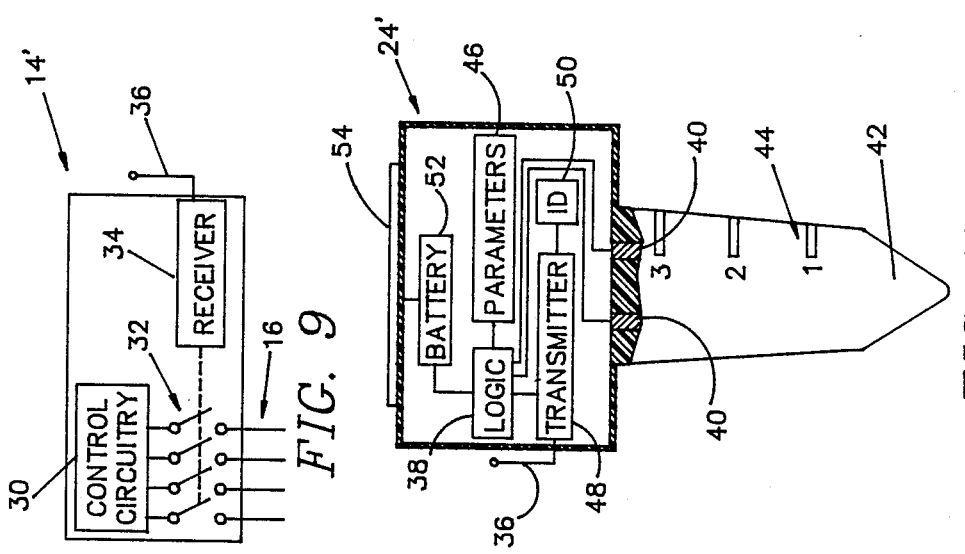
FIG. 11
FIG. 9
FIG. 10 most convenient. This prior art approach presupposes that the moisture content of the soil where the probe 24 is located is a proper indication of the moisture content of the soil throughout the system. Except in rare instances, that is a brash assumption which can lead to improper watering and, once again, dead plants.

It should also be mentioned in passing that some commercial irrigation systems provide a tank 26 for containing liquid fertilizer. The tank 26 is connected to the branch pipes 18 (or the input pipe 10) by a connecting pipe 28. A manual or automated valve (not shown) can be opened to allow the fertilizer to be mixed with the irrigation water and thereby fertilize the plants. Such systems are quite common for systems used in the irrigation of crops and hydroponics. Simple versions of this approach are also available for the home waterer, and the like. The mixer/dispenser connects to a hose bib and the hose is connected to the mixer/dispenser. Fertilizer pellets (or liquid) is placed in the mixer/dispenser which causes the fertilizer to be mixed with the water coming out of the hose.

Wherefore, it is the object of the present invention to provide an irrigation system which accurately controls the irrigation of areas as a function of the moisture content of the soil of the area.

It is another object of the present invention to provide an irrigation system which can be employed to retrofit existing irrigation systems with a minimum of inconvenience.

It is still another object of the present invention to provide an irrigation system which can easily adapt to the special watering needs of different plants within a given area.

It is yet another object of the present invention to provide an automated irrigation control system which can be added to present manual systems with a minimum of modification and digging.

It is a further object of the present invention to provide an irrigation system which includes fertilizing capability which can easily adapt to the special needs of different plants within a given area.

Other objects and benefits of the present invention will become apparent from the description which follows hereinafter when taken in conjunction with the drawing figures which accompany it.

SUMMARY

The foregoing objects have been achieved by the improved automated irrigation system of the present invention having localized moisture needs input to the control function comprising, a sprinkler head connected to a supply of water under pressure by a pipe having a valve therein; moisture sensing probe means placed in the soil adjacent the sprinkler head for developing an electrical signal representing the moisture content of the soil surrounding the probe means; and, irrigation bypass logic means disposed at the probe means and operably connected to the valve and the probe means for comparing the moisture content of the soil surrounding the probe means to pre-established limits and for preventing the valve from supplying water to the sprinkler head when there is sufficient moisture in the soil.

In the preferred embodiment, the valve is an electrically operated valve and there are, additionally, timer controller means for supplying power to the valve only at pre-selected times and adjusting means for adjusting the pre-established limits to suit the particular watering needs of the area into which the probe means is placed.

In one embodiment wherein the valve is an electrically operated valve operated by timer controller means connected for supplying power to the valve only at pre-selected times, wireless operation is provided by receiver means disposed at the timer controller means for receiving a radio frequency signal and for not supplying power to the valve in the presence of the radio frequency signal and transmitter means disposed in combination with the probe means for transmitting the signal when there is sufficient moisture in the soil. Where there are a plurality of valves connected to the timer controller means in the wireless version, there are identification code recognition means included within the receiver means disposed for disabling only the valve associated with an identification code appended to the radio frequency signal and identification code addition means included within the transmitter means for appending a unique identification code associated with the valve controlling the associated sprinkler head to the radio frequency signal when transmitting the signal.

In one variation, supplemental valve means are disposed in a pipe supplying water to one or more sprinkler heads and operably connected to the irrigation bypass logic means for operation thereby whereby the flow of water to the individual sprinkler heads is stopped when no water is needed in the area watered thereby. In a variation of that approach, the supplemental valve means is disposed in a riser pipe directly connected to a single sprinkler head. For use by governmental agencies along freeways and in other commercial applications wherein the riser pipe and the sprinkler head include quick disconnect coupling means for releasably connecting the sprinkler head to the riser pipe, the supplemental valve means also includes quick disconnect coupling means for releasably connecting the supplemental valve means between the sprinkler head and the riser pipe.

In the preferred embodiment, there are rechargeable battery means for supplying power to the irrigation bypass logic means and solar panel means for recharging the battery means.

In a unitary embodiment, there is a valve body containing the irrigation bypass logic means and having the probe means extending therefrom, the valve body having an inlet opening for receiving the water under pressure and an outlet opening having the sprinkler head connected thereto and supplemental valve means disposed in the valve body between the inlet and outlet openings and operably connected to the irrigation bypass logic means for operation thereby whereby the flow of water to the sprinkler head is stopped when no water is needed in the area.

For automatically adding fertilizer to the irrigation water on a locally optimized basis, there is a valve body having a bore therethrough extending between an inlet opening for receiving the water under pressure and an outlet opening having the sprinkler head connected thereto, the valve body further having a compartment for holding concentrated fertilizer with a first conduit connecting between the compartment and the bore adjacent the outlet opening and a second conduit connecting between the compartment and bore adjacent the inlet opening; valve means disposed in the first conduit for opening and closing the conduit; mechanical timer means operably connectable for operating the valve means for a pre-established period of time; means

SMART IRRIGATION SPRINKLERS

BACKGROUND OF THE INVENTION

The present invention relates to controllers for irrigation sprinklers and, more particularly, to an improved automated irrigation system having localized moisture needs input to the control function comprising, a sprinkler head connected to a supply of water under pressure by a pipe having a valve therein; moisture sensing probe means placed in the soil adjacent the sprinkler head for developing an electrical signal representing the moisture content of the soil surrounding the probe means; and, irrigation bypass logic means disposed at the probe means and operably connected to the valve and the probe means for comparing the moisture content of the soil surrounding the probe means to pre-established limits and for preventing the valve from supplying water to the sprinkler head when there is sufficient moisture in the soil.

Irrigation sprinkler systems tend to undergo little improvement with time and that progress which is made is mostly an adapting of new materials to old processes. Thus, the design of sprinkler heads originally fabricated out of metals has been copied in plastics. Likewise, the control functions originally accomplished with clock motors, cams and switches has now been copied with electronics. The result, in most cases is a system which looks "state-of-the-art" to the consumer but which, in fact, falls far short of providing adequate control of the irrigation function for the areas being watered by the system. This is true for both the small home user and the large commercial users such as golf courses, and the like. A typical blatant and irritating indication of the failure of these supposedly state-of-the-art irrigation control systems is seeing the sprinklers in an area operating in the rain during a drought. Not only that, most individuals do not known how to water plants properly. They either water too much or not enough. They also water in a manner which does not promote adequate root growth. As a result, in any water deprivation situation, the plants quickly die. With the conventional irrigation control system, it is these very people who program the controller. Since they don't know how to water, they simply set up the controller to water in the same wrong manner and assume that now that their irrigations have been turned over to the automated device, they no longer have to worry. Of course, when the plants die, they blame the irrigation system.

The typical approach to irrigation as employed in most control systems is depicted in FIGS. 1-3. An input pipe 10 connected to a source of water under pressure is connected to a plurality of valves 12 (only one being shown for simplicity) at a main site such as a garage, clubhouse, building basement, or the like. A controller 14 is placed adjacent the valves 12 and operably connected thereto with wires 16. The controller 14 is connected to an appropriate source of power (not shown), which is the reason that the controller 14 and valves 12 are all placed close adjacent the main site. Since multiple conductor wire as typically employed for the wires 16 is costly and a bother to bury in trenches between the controller 14 and valves 12, they are usually located within feet of each other. Each valve 12 has a branch pipe 18 connected thereto which extends from the main site to a remote site where there are to be a plurality of sprinkler heads 20 attached to riser pipes 22 connected into the branch pipe 18. In a typical yard for a home, the branch pipes 18 only extend 50-100 feet typically. In a golf course, or the like, they can extend by orders of magnitude.

Again, it is also typical that the sprinkler system is installed with virtually no relationship to the type of plants that are to be irrigated thereby. Even in high priced landscaping undertakings like golf courses, hotel grounds, etc., the landscaping is done by one entity and the irrigation system is installed by another entity with only a rough layout map to work from. It is generally assumed by all concerned that if the area is covered by a grid of sprinkler heads 20, the state-of-the-art irrigation control system will have no problem in properly watering the area. Nothing could be further from the truth. Once the landscaping has been completed and the operation of the system has been turned over to others, the failure of the system does not become apparent immediately. Rather, there is a continuous and insidious replacement of plants which have died—because of everything but the irrigation system. In the rare case where the failures of the irrigation system are recognized, the cost and inconvenience of digging up the old system and reinstalling it are generally a deterrent to actually accomplishing a meaningful modification. The management of an operating golf course is not about to shut the place down and allow trenches to be cut through the fairways to relay irrigation pipe. Thus, sprinkler heads 20 may be replaced and "adjusted" to vary flow rates and the watering times for the controller 14 may be varied; but, the system will not be made to work properly. Various plants with differing watering requirements being watered from a common branch pipe 18 will have to suffer (and probably die). Either some will be over watered or some will be under watered.

There has been some recognition in the art that it is stupid to operate the sprinkler system when it is raining (or has rained recently). Most controllers 14 have a "rain switch" that can be placed in a "rain" position when the operator knows that rain will take care of the irrigation for a given period. The rain switch merely disconnects the connection to the wires 16. In other regards, the controller 14 continues to operate. If the operator forgets to set the switch, the irrigation system operates anyway (including during a downpour). If the operator forgets to return the switch to its operating position, nothing gets watered at a later date and dries up. For the homeowner, this means having to have a "controller sitter" for the irrigation system when on vacation. It also means trudging through the rain and wet grass to turn off a controller mounted on the outside of the house that is watering the lawn during the rain.

Some controllers 14 have a series connection (like the above-described rain switch) to which a "rain sensor" can be operably connected. The typical rain sensor is a pan with a float connected to a switch. When it rains, the pan fills with water. If there is sufficient water in the pan to cause the float to operate the switch, the irrigation system is disconnected from the valves 12. A more exotic variation of that prior art approach is depicted in FIG. 2. In this case, a moisture sensor probe 24 is inserted in the ground to test the moisture content thereof. For the reasons set for above relative to running wires between components, the probe 24 is placed close to the controller 14 or the valves 12, whichever is for operating the timer from the movement of water through the bore; disconnect means for selectively activating an operating connection between the timer means and the valve means; and, operation counting means for counting the number of times water pressure appears in the bore and for causing the disconnect means to activate the operating connection between the timer means and the valve means every time water pressure has appeared in the bore a pre-established number of times whereby fertilizer contained in the compartment is added to irrigation water flowing through the bore through the first conduit for the pre-established period of time every time water pressure has appeared in the bore the pre-established number of times.

DESCRIPTION OF THE DRAWINGS

FIG. 1 is a simplified drawing showing a prior art approach to controlling a plurality of sprinkler heads on a common branch by means of a remotely located electronic controller.

FIG. 2 is a simplified drawing showing the sprinkler controller of FIG. 1 with a moisture sensor placed in series with the connection between the controller and the valve controlling water flow to the plurality of sprinkler heads on the common branch.

FIG. 3 is a simplified drawing showing a prior art approach to controlling a plurality of sprinkler heads on a common branch by means of a remotely located electronic controller as in FIG. 1 with a fertilizer injection system added for injecting liquid fertilizer into the common branch leading to the sprinkler heads.

FIG. 6 is a simplified drawing showing yet another approach to controlling a plurality of sprinkler heads on a common branch according to the present invention with a plurality of moisture sensors and control valves located at the site of the sprinkler heads to provide control of the sprinkler heads according to the moisture needs of the site as in the embodiment of FIG. 5 but wherein the sensors communicate with the valves by wireless transmission instead of by direct wire.

FIG. 7 is a simplified drawing of a preferred local valve and probe arrangement for use in a system such as that of FIG. 6 wherein there is a valve insertable into the riser pipe to a sprinkler head connected to a solar powered probe so as to provide control of the sprinkler head according to the moisture needs of the site where the probe is inserted into the ground.

FIG. 8 is a simplified drawing showing a variation of the unitary sprinkler body and moisture probe of FIG. 7 and showing a unitary sprinkler body and moisture probe for holding a sprinkler head to provide control of the sprinkler head according to the moisture needs of the site where the probe is inserted into the ground.

FIG. 9 is a functional block diagram of a wireless irrigation controller according to the present invention in a preferred embodiment.

FIG. 10 is a functional block diagram of a wireless irrigation moisture probe according to the present invention in a preferred embodiment intended for use with the controller of FIG. 9.

FIG. 11 is a simplified, partially cutaway side view of a unit to be installed in the riser pipe of an irrigation system according to the present invention to inject fertilizer into the irrigation water on an automatic basis.

Figure 4:
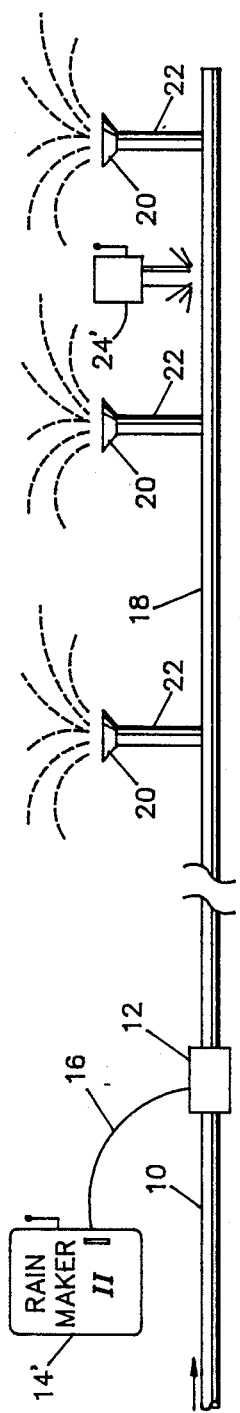
FIG. 4 is a simplified drawing showing one approach to controlling a plurality of sprinkler heads on a common branch by means of a remotely located electronic controller according to the present invention with a moisture sensor located at the site of the sprinkler heads providing a wireless feedback signal to the electronic controller.

DESCRIPTION OF THE VARIOUS EMBODIMENTS:

In its simplest embodiment, the present invention comprises the arrangement shown in FIG. 4. This embodiment is suitable for retrofitting an existing system with a minimum of disturbance and requiring no digging at the watering sites whatsoever. The original controller 14 is replaced with a new controller 14'. Otherwise, the remainder of the system remains as described with respect to FIG. 1. One or more wirelessly transmitting probes 24' are inserted in the ground at the remote site where the sprinkler heads are located. The controller 14' is functionally described in FIG. 9. The typical prior art control functions are provided at 30. The outputs from the control functions 30 to the wires 16 have series switches 32 therein in the same manner as the prior art "rain switches" described above. The switches 32, however, are operably connected to receiving logic 34 which, in turn, is connected to the antenna 36. Each of the switches 32 has a "station identification number" associated therewith. Turning now to FIG. 10, a typical probe 24' is shown in functional block diagram form. The probe 24' in its preferred form is controlled by logic 38. Logic 38 receives inputs from two sources. First, is from the probe elements 40. Moisture sensing probes are known in the art and, therefore, the workings thereof will not be described in detail herein in the interest of simplicity and the avoidance of redundancy. For the purposes hereof, it is sufficient to note that the logic 38 receives an electrical signal from the probe elements 40 related to the amount of moisture in the soil at the active depth of the elements 40. In the preferred embodiment, the elements 40 are located in a probe member 42 having depth indicia 44 on the outer surface thereof. The preferred probes are accompanied by an instruction sheet (not shown) indicating the proper depth for sensing with respect to various plants (and lawn products). Again, this information is well known to those skilled in the nurseryman's art and, per se, forms no part of the present information. Therefore, it is not set forth in detail herein.

The second input to the logic 38 in the preferred embodiment comes from input parameter means 46. This can be in the form of any of various types of devices known in the art for indicating selectable choices. The source of the information is the instruction sheet mentioned above. By means of the input parameter means 46, the user informs the logic 38 what type of plants are being watered according to various established groups having common watering needs. Thus, plants needing moisture to a certain degree at a depth of six inches would be watered to that state.

The output from the logic 38 is connected to an RF (radio frequency) transmitter 48. The transmitter 48 is connected to an antenna 36 and an identification number selector 50. The identification number selector 50 employs switches by means of which the user can set the probe 24' to the same station identification number as the wire 16 operating the branch's valve 12. In operation, the controller 14' is set to come on (i.e. offer the opportunity for watering) more often than necessary and at the preferred hours for irrigation (i.e. off hours for other water uses and times of minimum evaporation loss). As long as the probe 24' finds that the local area requires additional water to achieve the conditions that the input parameter through means 46 dictate, the connection to the associated valve 12 is made and water flows to the local sprinkler heads 20. When the conditions have been met, the logic 38 causes the transmitter 48 to send a signal to the receiving logic 34 with the station identification number appended thereto. Upon receiving the signal, the associated switch 32 for that branch pipe 18 is opened, causing the water flow thereto to be stopped. To prevent undesired short term watering, the logic 38 includes a working band of water depth swing; that is, once the conditions have been met, the soil must dry out to a given upper limit before water will be requested again, even though the moisture has risen above the set depth for the conditions. As those skilled in the art will readily appreciate, the probes 24' require a local power source to provide for their operation. In the preferred embodiment, power is conserved by the probe 24' sending its signal only as a short pulse on a periodic basis when the conditions are fulfilled. The preferred power source is a rechargeable battery 52 which is recharged by a solar cell 54 disposed on the top of the probe 24.

Figure 5:
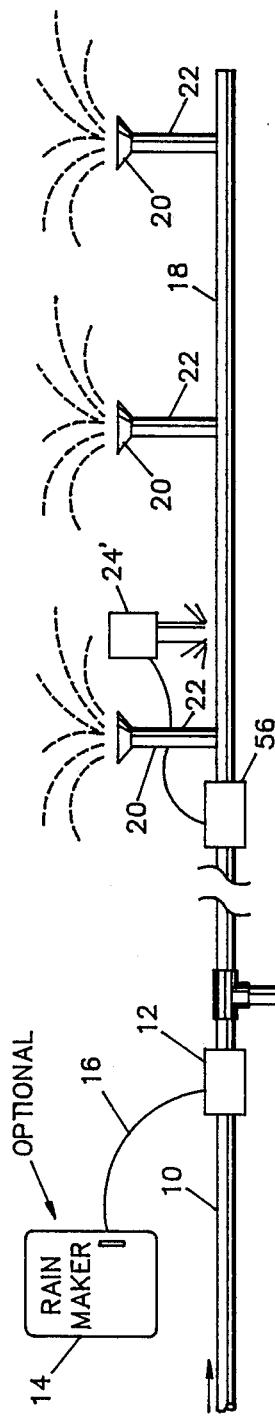
FIG. 5 is a simplified drawing showing another approach to controlling a plurality of sprinkler heads on a common branch according to the present invention with a plurality of moisture sensors and control valves located at the site of the sprinkler heads to provide control of the sprinkler heads according to the moisture needs of the site.

A variation of this approach is shown in FIG. 5. This embodiment is particularly useful in correcting a system that is not operating properly. Some local digging is required; but, as will be seen, it is minimum and should be of little consequence, even in an application such as a golf course or the like. The original (or a new prior art) controller 14 can be employed, if desired, to offer the opportunity for watering more often than necessary and at the preferred hours for irrigation as in the embodiment described above. Alternatively, while not preferred, a manual valve could be employed or the input pipe 10 simply left operably connected at all times. In this embodiment, each branch pipe 18 (or sub-branches thereof as desired or necessary) is provided with a local valve 56. The local valve 56 can be directly wired or be wireless and operate in the manner of the controller 14' described above. In either case, there is a probe 24' as described above which operates its associated valve 56 (by wire or wirelessly) to provide moisture as necessary to achieve its pre-set conditions. As can be appreciated, the only digging required to retrofit an existing irrigation to this embodiment is that necessary to add the valves 56 in line with the branch pipe 18—which is obviously minimal.

FIG. 6 depicts a variation of the previous embodiment. This variation requires no digging and provides even better control of the watering of an area. In this case, the local valves 56' are disposed in the riser pipes 22 of each sprinkler head 20. Such an approach would, of course, be more costly; but, for commercial applications and considering the cost of replacing lost plants expended each year throughout the country, the cost savings would most likely offset the additional cost of the equipment. Also, allowing for the reduced cost of installation over that of prior art systems, the cost for the additional equipment might actually be offset by the greatly reduced installation costs.

A preferred arrangement for the local valve 56 and probe 24' is shown in FIG. 7. The valve 56 is of minimal size and is connectable in series with the riser pipe 22. For commercial applications where the sprinkler head 20 is removable from the riser pipe by means of a "quick disconnect" coupling (such as along freeways so as to prevent theft of the sprinkler heads), the valve 56 can be provided with quick disconnect couplings as well. As mentioned with respect to another embodiment previously described herein, the associated probe 24' in its preferred embodiment is connected to the valve 56 by a connecting wire 58 and is powered by a rechargeable battery 52 that is recharged by a solar cell 54.

A variation of the arrangement of FIG. 7 is shown in FIG. 8. This unitary embodiment can be employed with underground pipe as part of a permanent irrigation system; but, is preferred for use with pipe or hose in an above-ground arrangement for either temporary or permanent use. In this embodiment, there is a valve body 60 having an input connection 62 on one side and a first output connection 64 on the top thereof. Preferably, the valve body 60 is made of plastic. The input connection 62 can be a slip fit for use with PVC, ABS, or the like, pipe or, preferably, threaded to connection to a standard garden hose. The first output connection 64 is threaded to receive a standard sprinkler head 20 therein. Preferably, there is a second output connection 66 connected directly to the input connection 62 and of the same type (i.e. slip or threaded) by means of which several of the valve bodies 60 can be interconnected at spaced intervals. Again, preference is for a threaded garden hose connection with a removable cap 68 provided for the case of single use (and for the last one in a string). The local valve 56' is contained therein and disposed between the input connection 62 and first output connection 64 to control the flow of water to the sprinkler head 20. A probe member 42 extends downward from the body 60 and contains probe elements 40 therein as with the probes previously described. There is also a battery 52 for power and logic 38 for operating the valve 56' as a function of the local moisture as determined from the signal from the probe elements 40, again as previously described. If desired, input parameters could also be provided as in previous embodiments. This embodiment is particularly useful in watering areas such as newly seeded areas where a constant moisture level must be maintained for a period of time to assure proper germination of the seeds. Prior art controllers 14 are simply not equipped to turn on the water in an area at numerous times throughout the day and night to assure a constantly moist environment. Thus, someone must constantly turn the sprinkler off and on during this period. By employing this embodiment of the present invention, one or more sprinkler heads can be placed in the newly seeded area on the end of a garden hose and will turn on and off automatically, as necessary, to maintain the soil in the proper state of moisture for seed germination.

Finally, as shown in FIG. 11, the preferred embodiment of the local valve 56 arrangement of FIG. 6 includes the additional capability of fertilizing the local area (and plants) according to a pre-established pattern as set to best suit the particular plants and employing the proper fertilizer type for the plants. Fertilizer pellets in various types for various plant varieties are well known and available commercially for use with hand watering and fertilizing devices. These pellets are concentrated and small in size and, therefore, are preferred for this variation of the present invention. Liquid, granular, or other types of concentrated fertilizers could, of course, be employed if desired by making appropriate modifications to the design. As with the embodiment of FIG. 8 described previously, there is a valve body 60' having an input connection 62 for the attachment of a water source thereto and an output connection 64 into which a sprinkler head 20 is threaded. A bore 63 extends between the input connection 62 and the output connection 64. The valve body 60' includes a compartment 70 which is sealably closed by a cap 72 for holding the concentrated fertilizer 74. A first conduit 76 connects the compartment 70 with the output connection 64 and a second conduit 78 connects the compartment 70 with the input connection 62 whereby water can enter the compartment 70 and dissolve the fertilizer 74 to make a concentrated solution which can be added to the water flowing through the valve body 60' by venturi or suction action in a manner well known to those skilled in the art. A valve 80 is disposed in-line with the first conduit 76 to control the flow of the fertilizing solution.

The heart of the fertilizing apparatus is a mechanical timer 82 which is operated by the turbine wheel 84 disposed in the bore 63 in the path of the water flow. The timer 82 is connected to operate the valve 80. Additionally, there is a cam wheel 86, or the like, operated by an advancing shaft 88 moved by a diaphragm 90 disposed in the bore 63 which activates the connection of the timer 82 to the valve 80. Such apparatus is representative only and the functional aspects to be described can be accomplished by any of several approaches well known to those skilled in the art. Preferably, the amount of time that the timer 82 maintains the valve 80 in an open state during watering is adjustable within the timer 82 as is the frequency with which the cam wheel 86 activates the timer connection (as by employing addable/removable cams 92 on the wheel 86 that move the shaft 94 that activates the timer's connection to the valve 80. In this way, as will be appreciated from the following description, the duration and frequency of the fertilizing process at each sprinkler head can be set to best suit the needs of the system. As those skilled in the art will also appreciate, while the fertilizing option of the present invention as now being described is preferably incorporated into the valves of a control system as hereinbefore described, the same novel approach could also be incorporated into a stand alone fertilizing unit to be added in-line at any point in an irrigation system's piping.

In use, each time the particular sprinkler is activated (manually or by automatic operation), the diaphragm 90 is depressed by the pressure of the water within the bore 63 thereby causing the cam wheel 86 to be advanced one position. At the pre-set number of operations (e.g. every fourth watering), a cam 92 moves shaft 94 which causes the valve 80 to opened by the timer 82. The valve 80 remains open (thereby adding fertilizer to the water from the sprinkler) for the time pre-set into the timer 82 and then is closed. The watering process then continues without the addition of the fertilizer—which is the preferred method of fertilizing an area.

Thus, it can be seen that the irrigation apparatus of the present invention has truly met its stated objectives by providing various embodiments which can be employed in new or retrofit applications to provide in automated irrigation system which maintains each defined area in a proper state of watering and fertilization according to pre-set conditions.

Wherefore, having thus described our invention, we claim:

1. In an irrigation system wherein a sprinkler head is selectably connected to a supply of water under pressure through a primary valve, the improvement comprising:
   (a) moisture sensing probe means placed in the soil adjacent the sprinkler head for developing an electrical signal representing the moisture content of the soil surrounding said probe means;
   (b) irrigation bypass logic means disposed at said probe means and operably connected to the valve and said probe means for comparing the moisture content of the soil surrounding said probe means to pre-established limits and for preventing the valve from supplying water to the sprinkler head when there is sufficient moisture in the soil; and,
   (c) supplemental valve means in a pipe disposed between the primary valve and the sprinkler head supplying water to the sprinkler head and connected to said irrigation bypass logic means for operation thereby for controlling the flow of water to the sprinkler head whereby the flow of water to the sprinkler head is stopped when no water is needed in the area.

2. The improvement to an irrigation system of claim 1 wherein:
   said supplemental valve means is disposed in a riser pipe directly connected to the sprinkler head.

3. The improvement to an irrigation system of claim 2 wherein:
   (a) said riser pipe and the sprinkler head include quick disconnect coupling means for releasably connecting the sprinkler head to said riser pipe; and,
   (a) said supplemental valve means includes quick disconnect coupling means for releasably connecting said supplemental valve means between the sprinkler head and said riser pipe.

4. The improvement to an irrigation system of claim 1 and additionally comprising:
   (a) a valve body containing said irrigation bypass logic means and having said probe means extending therefrom, said valve body having an inlet opening for receiving the water under pressure and an outlet opening having the spring head connected thereto; wherein,
   (b) said supplemental valve means is disposed in said valve body between said inlet and outlet openings.

5. The improvement to an irrigation system of claim 1 and additionally comprising:
   (a) a valve body having a bore therethrough extending between an inlet opening for receiving the water under pressure and an outlet opening having the sprinkler head connected thereto, said valve body further having a compartment for holding concentrated fertilizer with a first conduit connecting between said compartment and said bore adjacent said outlet opening and a second conduit connecting between said compartment and bore adjacent said inlet opening;
   (b) valve means disposed in said first conduit for opening and closing said conduit;
   (c) mechanical timer means operably connectable for operating said valve means for a pre-established period of time;

(d) means for operating said timer from the movement of water through said bore;

(e) disconnect means for selectively activating an operating connection between said timer means and said valve means; and, (f) operation counting means for counting the number of times water pressure appears in said bore and for causing said disconnect means to activate said operating connection between said timer means and said valve means every time water pressure has appeared in said bore a pre-established number of times whereby fertilizer contained in said compartment is added to irrigation water flowing through said bore through said first conduit for said pre-established period of time every time water pressure has appeared in said bore said pre-established number of times.

6. The improvement to an irrigation system of claim 1 and additionally comprising:

(a) a valve body having a bore therethrough extending between an inlet opening for receiving the water under pressure and an outlet opening having the sprinkler head connected thereto, said valve body further having a compartment for holding concentrated fertilizer with a first conduit connecting between said compartment and said bore adjacent said outlet opening and a second conduit connecting between said compartment and bore adjacent said inlet opening;

(b) valve means disposed in said first conduit for opening and closing said conduit;

(c) mechanical timer means operably connected for operating said valve means for a pre-established period of time; and, (d) means for operating said timer from the movement of water through said bore whereby fertilizer contained in said compartment is added to irrigation water flowing through said bore through said first conduit for said pre-established period of time.

7. The improvement to an irrigation system of claim 6 and additionally comprising:

(a) disconnect means for selectively activating an operating connection between said timer means and said valve means; and, (b) operation counting means for counting the number of times water pressure appears in said bore and for causing said disconnect means to activate said operating connection between said timer means and said valve means every time water pressure has appeared in said bore a pre-established number of times whereby fertilizer contained in said compartment is added to irrigation water flowing through said bore through said first conduit for said pre-established period of time only when water pressure has appeared in said bore said pre-established number of times.

8. Apparatus for installation into a pipe carrying irrigation water to add fertilizer to the irrigation water comprising:

(a) a valve body having a bore therethrough extending between an inlet opening for receiving the irrigation water under pressure and an outlet opening for conducting the irrigation water to a next point of use, said valve body further having a compartment for holding concentrated fertilizer with a first conduit connecting between said compartment and said bore adjacent said outlet opening and a second conduit connecting between said compartment and bore adjacent said inlet opening;

(b) valve means disposed in said first conduit for opening and closing said conduit;

(c) mechanical timer means operably connected for operating said valve means for a pre-established period of time; and, (d) means for operating said timer from the movement of the irrigation water through said bore whereby fertilizer contained in said compartment is added to the irrigation water flowing through said bore through said first conduit for said pre-established period of time.

9. The apparatus of claim 8 and additionally comprising:

(a) disconnect means for selectively activating an operating connection between said timer means and said valve means; and, (b) operation counting means for counting the number of times water pressure appears in said bore and for causing said disconnect means to activate said operating connection between said timer means and said valve means every time water pressure has appeared in said bore a pre-established number of times whereby fertilizer contained in said compartment is added to the irrigation water flowing through said bore through said first conduit for said pre-established period of time only when water pressure has appeared in said bore said pre-established number of times.

10. An improved automated irrigation system having localized moisture needs input to the control function comprising:

(a) a sprinkler head connected to a supply of water under pressure by a pipe having a primary valve therein;

(b) moisture sensing probe means placed in the soil adjacent said sprinkler head for developing an electrical signal representing the moisture content of the soil surrounding said probe means;

(c) a supplemental valve disposed downstream from said primary valve in a pipe supplying water to said sprinkler head; and (d) irrigation bypass logic means disposed at said probe means and operably connected to said supplemental valve and said probe means for comparing the moisture content of the soil surrounding said probe means to pre-established limits and for preventing said supplemental valve from supplying water to said sprinkler head when there is sufficient moisture in the soil.

11. The improved irrigation system of claim 10 wherein: said supplemental valve is disposed in a riser pipe directly connected to said sprinkler head.

12. The improved irrigation system of claim 11 wherein:

(a) said riser pipe and said sprinkler head include quick disconnect coupling means for releasably connecting said sprinkler head to said riser pipe; and (b) said supplemental valve includes quick disconnect coupling means for releasably connecting said supplemental valve between said sprinkler head and said riser pipe.

13. The improved irrigation system of claim 10 and additionally comprising:

(a) a valve body containing said irrigation bypass logic means and having said probe means extending therefrom said valve body having an inlet opening for receiving the water under pressure and an outlet opening having said sprinkler head connected thereto; wherein, (b) said supplemental valve is disposed in said valve body between said inlet and outlet openings.

14. The improved irrigation system of claim 10 and additionally comprising:

(a) valve body having a bore therethrough extending between an inlet opening for receiving the water under pressure and an outlet opening having said sprinkler head connected thereto, said valve body further having a compartment for holding concentrated fertilizer with a first conduit connecting between said compartment and said bore adjacent said outlet opening and a second conduit connecting between said compartment and bore adjacent said inlet opening;

(b) valve means disposed in said first conduit for opening and closing said conduit;

(c) mechanical timer means operably connectable for operating said valve means for a pre-established period of time;

(d) means for operating said timer from the movement of water through said bore;

(e) disconnect means for selectively activating an operating connection between said timer means and said valve means; and, (f) operation counting means for counting the number of times water pressure appears in said bore and for causing said disconnect means to activate said operating connection between said timer means and said valve means every time water pressure has appeared in said bore a pre-established number of times whereby fertilizer contained in said compartment is added to irrigation water flowing through said bore through said first conduit for said pre-established period of time every time water pressure has appeared in said bore said pre-established number of times.

15. The improved irrigation system of claim 10 and additionally comprising:

(a) a valve body having a bore therethrough extending between an inlet opening for receiving the water under pressure and an outlet opening having said sprinkler head connected thereto, said valve body further having a compartment for holding concentrated fertilizer with a first conduit connecting between said compartment and said bore adjacent said outlet opening and a second conduit connecting between said compartment and bore adjacent said inlet opening;

(b) valve means disposed in said first conduit for opening and closing said conduit;

(c) mechanical timer means operably connected for operating said valve means for a pre-established period of time: and, (d) means for operating said timer from the movement of water through said bore whereby fertilizer contained in said compartment is added to irrigation water flowing through said bore through said first conduit for said pre-established period of time.

16. The improved irrigation system of claim 25 and additionally comprising:

(a) disconnect means for selectively activating an operating connection between said timer means and said valve means; and, (b) operation counting means for counting the number of times water pressure appears in said bore and for causing said disconnect means to activate said operating connection between said timer means and said valve means every time water pressure has appeared in said bore a pre-established number of times whereby fertilizer contained in said compartment is added to irrigation water flowing through said bore through said first conduit for said pre-established period of time only when water pressure has appeared in said bore said pre-established number of times.

* * * * *